United States Patent
Kanki

(10) Patent No.: US 10,491,765 B2
(45) Date of Patent: Nov. 26, 2019

(54) OPERATION CONSOLE RECEIVING USER OPERATION AND ELECTRONIC DEVICE AND IMAGE FORMING APPARATUS PROVIDED WITH THE OPERATION CONSOLE

(71) Applicant: Sharp Kabushiki Kaisha, Osaka-shi, Osaka (JP)

(72) Inventor: Yoshinori Kanki, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 104 days.

(21) Appl. No.: 14/669,065

(22) Filed: Mar. 26, 2015

(65) Prior Publication Data

US 2015/0288836 A1 Oct. 8, 2015

(30) Foreign Application Priority Data

Apr. 4, 2014 (JP) .................... 2014-077729

(51) Int. Cl.
*G03G 15/00* (2006.01)
*G06F 3/00* (2006.01)
*H04N 1/00* (2006.01)

(52) U.S. Cl.
CPC ..... *H04N 1/00514* (2013.01); *H04N 1/00413* (2013.01); *H04N 1/00474* (2013.01);
(Continued)

(58) Field of Classification Search
CPC .... G06F 3/1205; G06F 3/1257; G06F 3/1262; G06F 3/1286; G06F 3/0484;
(Continued)

(56) References Cited

U.S. PATENT DOCUMENTS 5,907,319 A 5/1999 Hashimoto et al.
9,213,289 B2 * 12/2015 Tomiyasu ............ G03G 15/502
(Continued)

FOREIGN PATENT DOCUMENTS

JP 08-307570 A 11/1996
JP 2003-051903 A 2/2003
(Continued)

OTHER PUBLICATIONS

English Machine Translation of JP 2005-074716-A (Mochizuki, Published Mar. 24, 2005).*

*Primary Examiner* — Benny Q Tieu
*Assistant Examiner* — Juan M Guillermety
(74) *Attorney, Agent, or Firm* — Keating & Bennett, LLP

(57) ABSTRACT

An operation unit is an operation console receiving a user operation, and it includes a display panel. The display panel displays a regular UI including a plurality of setting keys for setting functions, or a simplified UI including setting keys for setting some of the functions settable by the regular UI, under the control of a control unit. The control unit switches the UI screen displayed on the display panel from one to the other of the regular UI and the simplified UI, in response to a user operation. The control unit further determines whether or not a function has been set before the switching of UI screen, and depending on a result of determination, switches the UI screen while maintaining the setting of the function.

4 Claims, 14 Drawing Sheets

(52) U.S. Cl.
CPC ..... *H04N 1/00506* (2013.01); *H04N 1/00517* (2013.01); *H04N 2201/0094* (2013.01)

(58) Field of Classification Search
CPC .... G06F 3/1253; G03G 15/502; G06K 15/02; H04N 1/00233; H04N 1/32101; H04N 1/00957; H04N 1/00514; H04N 1/00413; H04N 1/00506; H04N 1/00517; H04N 1/00474; H04N 2201/0094
USPC .............................................. 358/1.13, 1.14
See application file for complete search history.

(56) References Cited

U.S. PATENT DOCUMENTS

| | | | | |
|---|---|---|---|---|
| 2005/0099645 | A1* | 5/2005 | Saito | G06F 3/1205 358/1.13 |
| 2005/0210408 | A1* | 9/2005 | Baranda | G06F 9/4443 715/810 |
| 2006/0071903 | A1* | 4/2006 | Shiono | G06F 3/1205 345/156 |
| 2008/0162629 | A1* | 7/2008 | Ashida | G06F 3/1205 709/203 |
| 2008/0231898 | A1* | 9/2008 | Iwanaga | G06F 3/1284 358/1.15 |
| 2011/0141505 | A1* | 6/2011 | Haga | H04N 1/00233 358/1.9 |
| 2012/0069364 | A1* | 3/2012 | Kodama | H04N 1/00413 358/1.9 |
| 2013/0120768 | A1* | 5/2013 | Yamada | G06F 3/1256 358/1.6 |
| 2014/0118782 | A1* | 5/2014 | Tamai | H04N 1/00413 358/1.15 |
| 2014/0211245 | A1* | 7/2014 | Maruyama | G06F 3/1205 358/1.15 |

FOREIGN PATENT DOCUMENTS

| | | |
|---|---|---|
| JP | 2005-74716 A | 3/2005 |
| JP | 2014-019150 A | 2/2014 |

* cited by examiner

OPERATION CONSOLE RECEIVING USER OPERATION AND ELECTRONIC DEVICE AND IMAGE FORMING APPARATUS PROVIDED WITH THE OPERATION CONSOLE

CROSS-REFERENCE TO RELATED APPLICATION

This nonprovisional application claims priority under 35 U.S.C. § 119(a) to Patent Application No. 2014-077729 filed in Japan on Apr. 4, 2014, the entire contents of which are hereby incorporated by reference.

BACKGROUND OF THE INVENTION

Field of the Invention

The present invention relates to an operation console and to an electronic device and an image forming apparatus provided with the operation console. More specifically, the present invention relates to a technique for improving convenience of use of the operation console.

Description of the Background Art

As one type of information processing apparatuses, an image forming apparatus (typically a copy machine) has been introduced to many places of business (companies and offices). Image forming apparatuses having a plurality of operational modes including a copy mode, an image communication mode (typically a facsimile mode), a network compatible printer mode and a scanner mode, such as an MFP (MultiFunction Peripheral), are increasing in number.

Such an information processing apparatus is provided with an operation device or an operation console having an operation portion for setting various functions and parameters and a display portion for displaying state of job progress and the like. Recently, information processing apparatuses come to have much increasing number of functions. User interface (hereinafter denoted as "UI") of an operation console becomes complicated when functions are added. For a user not familiar with such an information processing apparatus, UI with complicated configuration is not very user-friendly.

Ideally, UI should be easy to use for every user. Such an ideal UI would be realized relatively easily if users are limited to some extent. A multi-functional peripheral as one type of information processing apparatus, however, have many functions and capable of various processes and, therefore, wide range of users use the apparatus. Therefore, it is difficult to realize a UI that is easy to use for every user.

In view of the foregoing, conventionally, a method has been proposed in which a plurality of UIs are prepared, allowing each user to select one UI that is suitable for him/her.

Japanese Patent Laying-Open No. 2003-51903 (hereinafter referred to as '903 Reference) discloses a communication apparatus utilizing this method. The communication apparatus of '903 Reference includes a display unit for displaying a menu, and a "simple operation" key for switching the menu display between a regular menu and a simplified menu. The regular menu lists substantially all selectable manners (functions) related to communication operations. The simplified menu lists, of all selectable manners (functions) related to communication operations, only some prescribed manners (functions). The regular menu is intended for users requiring high functions, while the simplified menu is intended for users requiring simple functions only. The "simple operation" key is for setting in advance which of the regular menu and the simplified menu is to be displayed on the display unit. When a facsimile transmission key is pressed while a standby image is being displayed, for example, the simplified menu or the regular menu appears on the display unit depending on whether the "simple operation" key is on or off. It is possible for the user to have the menu suitable for him/her by setting the display menu in advance, by operating the "simple operation" key.

In the communication apparatus according to '903 Reference, the user is asked to select either the regular menu or the simplified menu. If the user is not sure which to choose, it will be confusing. It may be the case that he/she selects the simplified menu believing that the simple functions will be sufficient but the desired function is not included in the simplified menu, or that he/she selects the regular menu only to find that the regular menu has too many functions and difficult to use. In other words, the menu selected in advance might not be the menu suitable for the user.

In such a situation, according to '903 Reference, it is necessary to once return to the standby screen, to switch the menu and then to display the switched-in menu. Such an operation is troublesome and time-consuming for the user. In addition, it is necessary for the user to re-do the settings and the like, using the switched-in menu. Therefore, the communication apparatus according to '903 Reference is not necessarily convenient for the users.

SUMMARY OF THE INVENTION

Therefore, it is desirable to provide an operation console convenient for the users and electronic device and image forming apparatus provided with such an operation console.

According to a first aspect, the present invention provides an operation console provided on an apparatus as an object of control, including: a display unit configured to display information related to a process executed by the apparatus as the object of control; an input receiving unit configured to receive an input of an operation instruction related to information to be displayed on the display unit; a display control unit configured to control the display unit such that a first operation screen including a plurality of items settable by an input of an operation instruction received by the input receiving unit or a second operation screen including part of the plurality of items is displayed; a display switching unit configured to control the display control unit, responsive to reception of an instruction input by a user, such that the operation screen displayed on the display unit is switched from one to the other of the first operation screen and the second screen; a determining unit configured to determine whether or not any item has been set before the switching of display by the display switching unit; and a setting maintaining unit configured to maintain setting of the set item, on the switched-in operation screen after the switching by the display switching unit, depending on a result of determination by the determining unit.

In the operation console, in response to an instruction input by the user, the operation screen that is being displayed is switched from one to the other of the first and second operation screens. Even when the user does not know which screen should be selected, the operation screens can easily be switched. Therefore, the operation screen suitable for the user can easily be selected. The operation console further determines whether or not any item has been set before the switching of display. If there is any item that has been set, the setting of the item is maintained on the operation screen after the switching of display. Therefore, it is unnecessary to re-do the settings and the like anew on the switched-in operation screen. Thus, the operation console of the present invention allows switching of the operation screen without requiring any troublesome and time-consuming operation. In addition, it is unnecessary to re-do the settings. Thus, it is more convenient for the user.

Preferably, the determining unit includes a setting determining unit configured to determine, of the plurality of items, whether or not any item not included in the second operation screen has been set on the first operation screen; and the display control unit includes a screen display control unit configured to control the display unit such that, when the display is switched from the first operation screen to the second operation screen, the second operation screen is displayed in a manner indicating that, of the plurality of items, an item not included in the second operation screen has been set, in accordance with a result of determination by the setting determining unit.

More preferably, the operation console further includes a cancelling unit configured to cancel, in a state in which the second operation screen is displayed, setting of only the item not included in the second operation screen, of the plurality of items.

More preferably, the first and second operation screens each include an operation item operated by the user when display of the operation screen is to be switched; and the display switching unit includes a screen display switching unit configured to control the display control unit such that the operation screen displayed on the display unit is switched from one to the other of the first and second operation screens, in response to an operation of the operation item by the user.

More preferably, the determining unit includes a setting determining unit configured to determine whether an item common to the first and second operation screens has been set before the switching of display by the display switching unit; and the setting maintaining unit includes a common setting maintaining unit configured to maintain setting of the set common item, on the switched-in operation screen after the switching by the display switching unit, in accordance with result of determination by the setting determining unit.

According to a second aspect, the present invention provides an electronic device including the operation console in accordance with the first aspect described above and a process executing unit configured to execute, in response to an instruction from the operation console, the process designated by the instruction.

According to a third aspect, the present invention provides an image forming apparatus including the operation console in accordance with the first aspect described above and an image forming unit configured to form an image on a recording medium in response to an instruction from the operation console.

As described above, by the present invention, an operation console convenient for use by the user, and an electronic device and an image forming apparatus that are provided with such an operation console can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
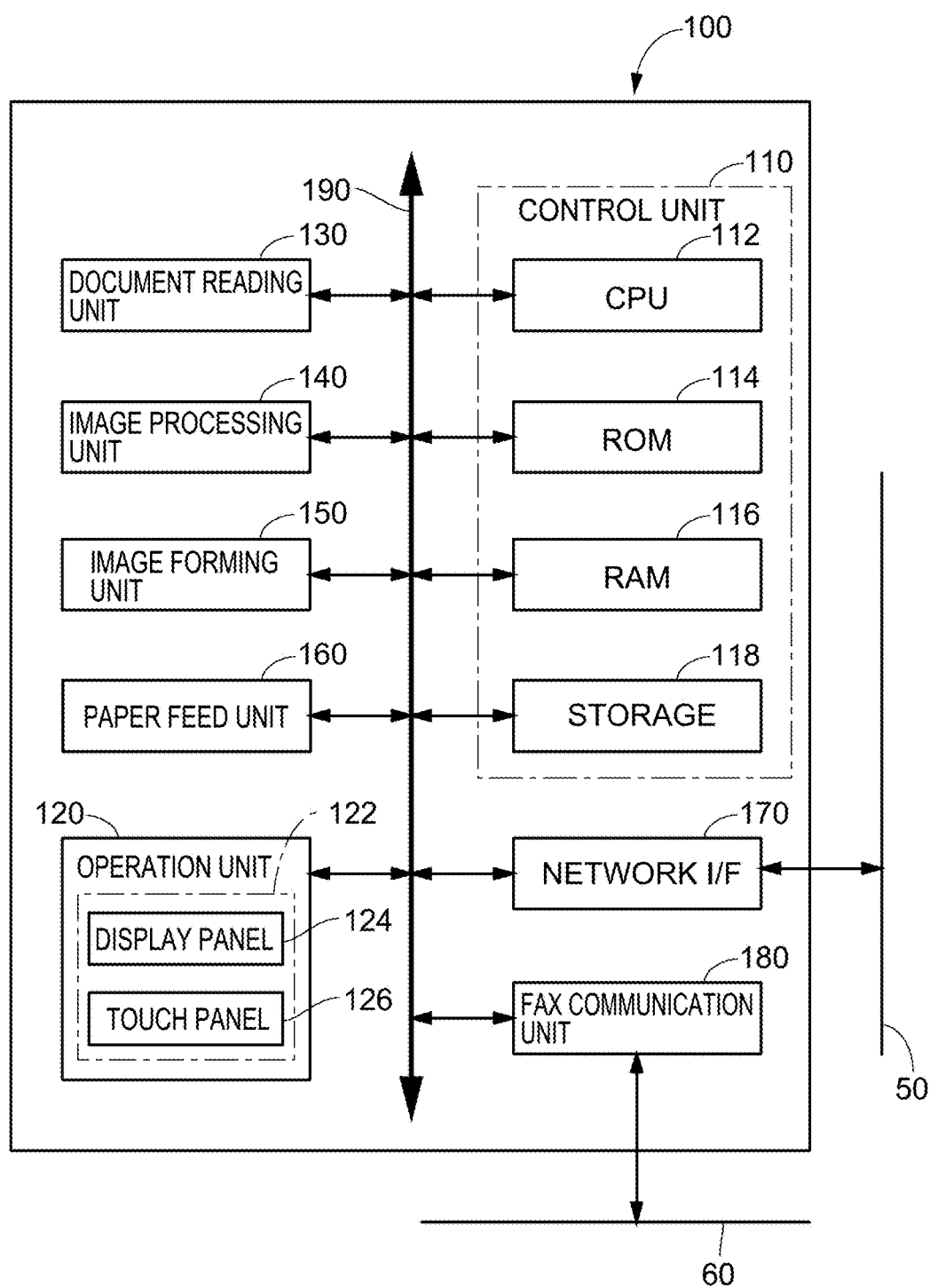
FIG. 1 is a control block diagram showing a hardware configuration of an image forming apparatus in accordance with a first embodiment of the present invention.

In the embodiments described in the following, the same components are denoted by the same reference characters. Their functions and names are also the same. Therefore, detailed descriptions thereof will not be repeated. In the following, an example in which the present invention is applied to an image forming apparatus as one type of information processing apparatus will be described.

First Embodiment

Referring to FIG. 1, an image forming apparatus 100 in accordance with a first embodiment of the present invention is a multifunctional peripheral (MFP) having, by way of example, a copy function and a printer function. Image forming apparatus 100 has a so-called laser type (electrophotographic) printing function, using a laser beam for exposure. The apparatus, however, may have a different type printing function.

Image forming apparatus 100 has a plurality of operational modes including copy mode, scanner mode and facsimile mode. When any of the operational modes is set by the user, image forming apparatus 100 executes various jobs corresponding to the set operational mode.

[Hardware Configuration]

Image forming apparatus 100 includes a control unit 110, an operation unit 120, a document reading unit 130, an image processing unit 140, an image forming unit 150, a paper feed unit 160, a network interface (hereinafter referred to as "network I/F") 170, and a FAX communication unit 180.

Control unit 110 is substantially a computer, and it includes: a CPU (Central Processing Unit) 112 for overall control of image forming apparatus 100; an ROM (Read-Only Memory) 114 for storing a program and the like; an RAM (Random Access Memory) 116 as volatile storage; and a storage 118. Storage 118 is non-volatile storage that retains data even when power is turned off, and it includes a hard disk drive, a flash memory or the like. A bus line 190 is connected to CPU 112, and ROM 114, RAM 116 and storage 118 are electrically connected to bus line 190.

CPU 112 executes various computer programs in accordance with an instruction from operation unit 120 or the like, and thereby executes operations of various units of image forming apparatus 100 and desired processes including communication with an external device such as an information processing apparatus. The afore-mentioned various computer programs are stored in advance in ROM 114 or in storage 118 and when a desired process is to be executed, read from ROM 114 or storage 118 and transferred to RAM 116. CPU 112 reads and interprets a program instruction from RAM 116 at an address designated by a value stored in a register, referred to as a program counter, not shown, in CPU 112. Further, CPU 112 reads data necessary for an operation from an address designated by the read instruction and executes an operation corresponding to the instruction on the data. The result of execution is also stored in an address designated by the instruction in a register in CPU 112, storage 118 or RAM 116.

In ROM 114 or storage 118, a computer program for realizing general operations of image forming apparatus 100 is stored. The computer program is written in ROM 114 or storage 118 at the time of manufacturing of image forming apparatus 100. The computer program may be provided from, for example, an external information processing apparatus through a network and network I/F 170. Further, the computer program may be provided through a recording medium such as a DVD recording the computer program. Specifically, the DVD as a recording medium of the computer program may be loaded to a built-in DVD drive (not shown) of image forming apparatus 100, and the computer program may be read from the DVD and installed in storage 118. Storage 118 also stores various data including image data.

To bus line 190, operation unit 120, document reading unit 130, image processing unit 140, image forming unit 150, paper feed unit 160, network I/F 170 and FAX communication unit 180 are further electrically connected.

Operation unit 120 receives user operations. Operation unit 120 includes a touch-panel display 122. Touch-panel display 122 includes a display panel 124 formed, for example, of a liquid crystal panel, and a touch-panel 126 placed on display panel 124 for detecting a touched position. Display panel 124 provides the user with various pieces of information related to the state of image forming apparatus 100 and states of various processes. Touch-panel display 122 also provides an interactive operation interface (user interface: UI) for the user. The interactive operation interface receives instructions by the user related to the overall operation of image forming apparatus 100 through touch-panel 126, displays the contents of instructions on display panel 124, and outputs control signals in accordance with the instructions to control unit 110 or the like.

By way of example, display panel 124 displays a home screen (not shown) allowing selection of a desired operational mode from a plurality of operational modes, current state of image forming apparatus 100, status designation of FAX transmission destination, job processing status and the like. The display operation of display panel 124 is controlled by CPU 112. On a display area of display panel 124, software keys are displayed. When the user presses a software key, touch-panel 126 detects the pressed position. CPU 112 compares the display positions of the software keys and the pressed position of the touch panel on a program and, based on the result of comparison, selects an operational mode, sets various functions and parameters, and instructs an operation.

Operation unit 120 further includes a home key (not shown), which is a hardware key. The home key is to instruct return to the home screen. For example, when the user operates the home key, the home screen is displayed on display panel 124 (touch-panel display 122). When the user operates the home screen and selects one operational mode from the plurality of operational modes, an operation screen (UI screen) of the selected operational mode is displayed.

A plurality of UI screens are prepared for each operational mode. The plurality of UI screens include a regular UI, which is a regular UI screen, and a simplified UI, which is simplified for easier operation than the regular UI. The regular UI is a UI screen of full functions allowing setting of all functions available in the selected operational mode. The regular UI includes a plurality of software keys for setting functions of the selected operational mode.

On the other hand, the simplified UI is a UI screen that is simple and allows easier operations. Simplified UI allows selection of prescribed functions (some functions) of the full functions available for the selected operational mode. Specifically, functions settable by simplified UI are limited. The simplified UI includes software keys for setting the prescribed ones (some) of the functions of selected operational mode. Image forming apparatus 100 in accordance with the present invention is configured to allow easy switching from the regular UI to the simplified UI or from the simplified UI to the regular UI at any desired timing in response to a user instruction. Further, image forming apparatus 100 is configured such that if the UI screen is switched after a function is set, the setting before the switching is maintained after the switching.

Document reading unit 130 includes a document scanning unit including a light source, a reflection mirror, an optical lens and a CCD (Charge-Coupled Device) line sensor (all not shown). The document scanning unit irradiates an image-bearing surface of a document placed on a platen with light from a light source, and forms an image of reflected light. The reflection mirror and the optical lens form an image of the resulted image of reflected light on the CCD line sensor. The CCD line sensor successively executes photo-electric conversion of the thus formed image of reflected light and outputs the resulting image data to image processing unit 140. Specifically, at the time of copying or scanning of the document, document reading unit 130 reads image information from the document placed on the platen, converts the read image information to electric signals, and outputs the result as image data to image processing unit 140.

Image processing unit 140 includes an MPU (Micro Processing Unit, not shown). Image processing unit 140 performs various processes including a prescribed image processing such as rasterizing, on the image data received from document reading unit 130, an image processing apparatus or the like to form print data of a prescribed tone, and outputs it to image forming unit 150.

Image forming unit 150 prints the image represented by the image data in a single color or colors on a sheet of recording paper, and it includes, by way of example, a photoreceptor drum, a charger, a laser scan unit (LSU), a developer, a transfer device, a cleaning device, a fixing device, and a neutralizer. Image forming unit 150 is provided with a conveyor path, for example, along which a sheet of recording paper fed from a paper feed unit 160 is conveyed.

Paper feed unit 160 includes a cassette tray (not shown) capable of containing a plurality of (for example, 500) sheets of recording paper. Paper feed unit 160 draws sheets of recording paper contained in the cassette tray one by one and feeds the sheets to the conveyor path of image forming unit 150. While the sheet of recording paper is fed along the conveyor path of image forming unit 150, the sheet passes between the photoreceptor drum and the transfer device and further passes through the fixing device, whereby printing is done on the sheet of recording paper.

The photoreceptor drum rotates in one direction. The surface of photoreceptor drum is cleaned by the cleaning device and the neutralizer, and thereafter it is uniformly charged by the charger. The laser scan unit modulates a laser beam based on the image data as the object of printing, and repeatedly scans the surface of photoreceptor drum with the laser beam in the main scanning direction, whereby a latent electrostatic image is formed on the surface of photoreceptor drum. The developer supplies toner to the surface of photoreceptor drum to develop the latent electrostatic image and thereby forms a toner image on the surface of photoreceptor drum. The transfer device transfers the toner image on the surface of photoreceptor drum to the sheet of recording paper passing between the transfer device and the photoreceptor drum.

The fixing device includes a heating roller for heating the sheet of recording paper and a pressure roller for pressing the sheet of recording paper. The sheet of recording paper is heated by the heating roller and pressed by the pressure roller, whereby the toner image transferred to the sheet of recording paper is fixed thereon. The sheet of recording paper discharged from the fixing device (printed sheet) is discharged to a discharge tray.

Network I/F 170 provides an interface with network 50. Image forming apparatus 100 is capable of data communication in accordance with a prescribed communication protocol with an information processing apparatus or the like on network 50 through network I/F 170. Image forming apparatus 100 is capable of receiving instruction signals instructing execution of various processes such as a print job, from an information processing apparatus through network I/F 170.

FAX communication unit 180 is an interface connected to a telephone network 60 enabling facsimile communication through telephone network 60. Image forming apparatus 100 is capable of FAX communication with an external facsimile device (not shown) through FAX communication unit 180 and telephone network 60.

[Configuration of UI Screen]

In the following, the regular UI and the simplified UI displayed on touch-panel display 122 will be described, assuming that copy mode is the selected operational mode.

Figure 2:
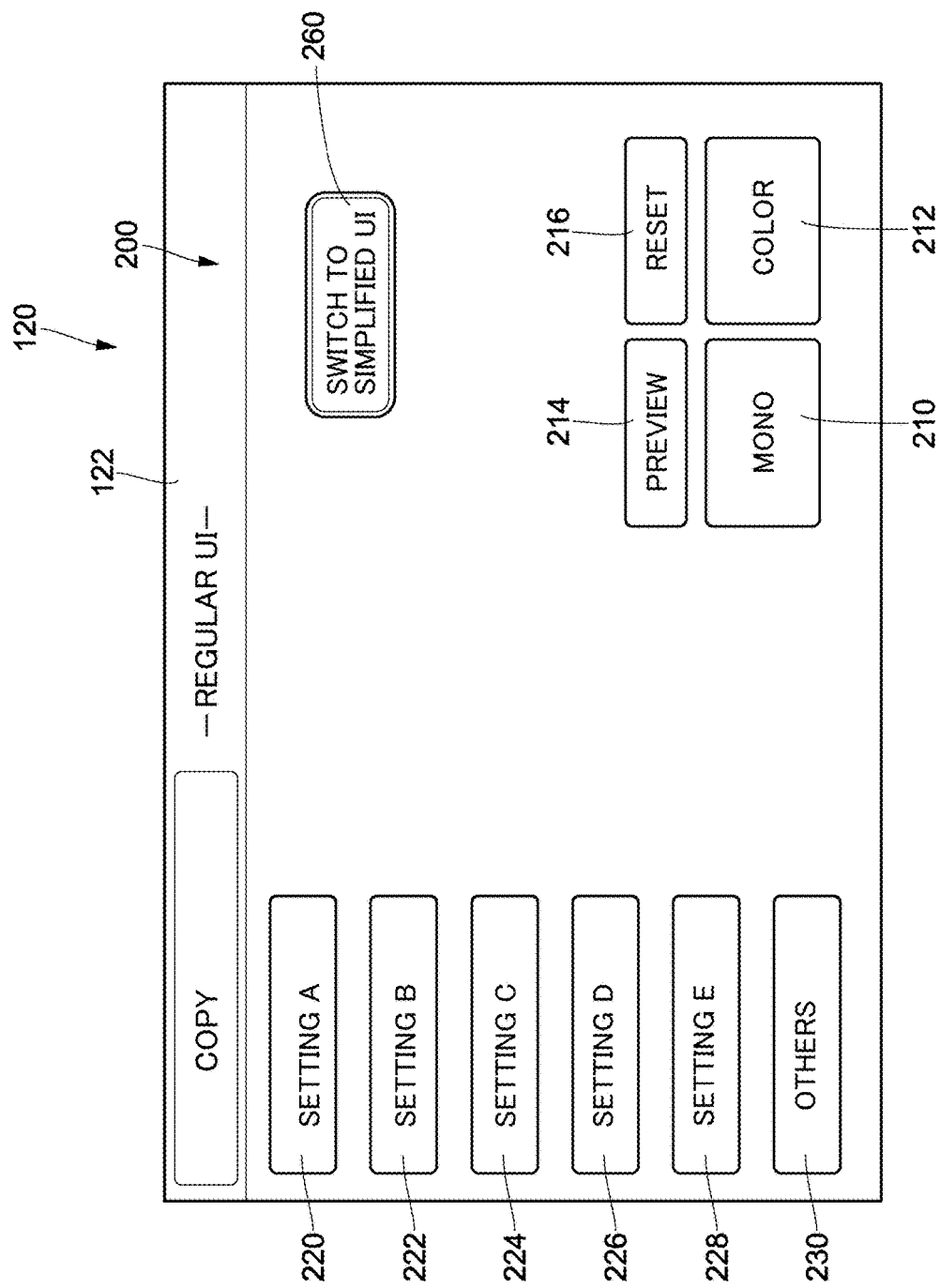
FIG. 2 shows an example of a UI screen displayed on an operation unit of the image forming apparatus shown in FIG. 1.

Referring to FIG. 2, regular UI 200 includes a "MONO" key 210 for starting monochrome copy printing, a "COLOR" key 212 for starting color copy printing, a "PREVIEW" key 214 for displaying a preview image, and a "RESET" key 216 for cancelling settings. Regular UI 200 further includes a plurality of software keys (setting keys) for setting various functions available in the copy mode. When these setting keys are operated, functions corresponding to the operated setting keys are set. In FIG. 2, these keys are shown simply as "SETTING A" key 220, "SETTING B" key 222, "SETTING C" key 224, "SETTING D" key 226, "SETTING E" key 228 and "OTHERS" key 230.

"SETTING A" key 220 to "SETTING E" key 228 are software keys for setting functions that are used relatively frequently. "SETTING A" key 220 is, for example, a software key for setting the number of copies, and "SETTING B" key 222 is, for example, a software key for two-sided/one-sided copy. "SETTING C" key 224 is, for example, a software key for setting color mode, "SETTING D" key 226 is, for example, a software key for setting copy density, and "SETTING E" key 228 is, for example, a software key for setting magnification. Functions other than these are set by an operation of "OTHERS" key 230.

Figure 3:
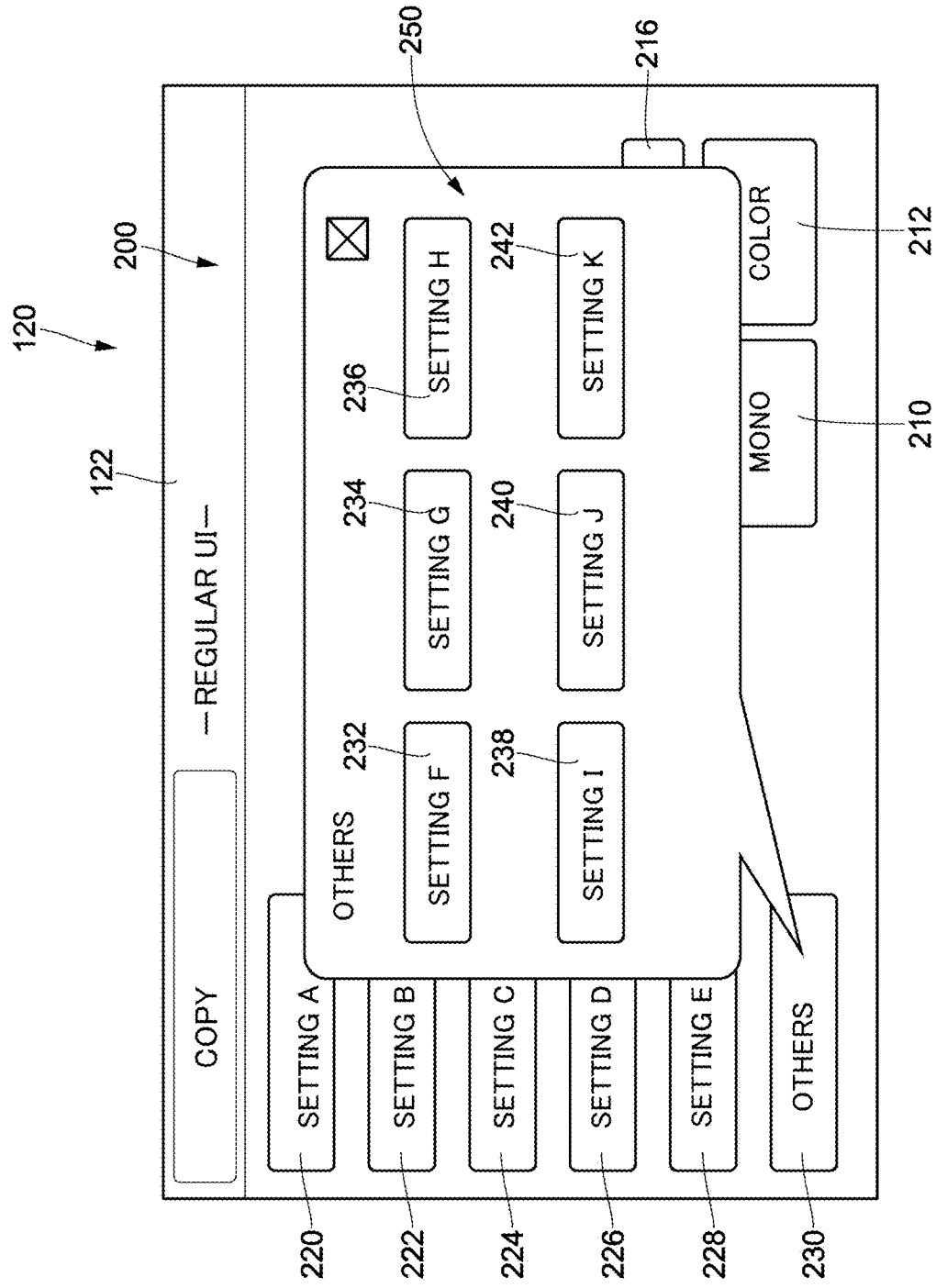
FIG. 3 shows another example of a screen image on the UI screen (regular UI) of FIG. 2.

Referring to FIG. 3, when "OTHERS" key 230 is operated, a screen image 250 including setting keys for setting other functions pops up. FIG. 3 shows an example, in which a plurality of setting keys are displayed on a screen image 250. In FIG. 3, these plurality of setting keys are simply shown as "SETTING F" key 232, "SETTING G" key 234, "SETTING H" key 236, "SETTING I" key 238, "SETTING J" key 240 and "SETTING K" key 242. The functions set by the setting keys 232 to 242 ("SETTING F" key 232 to "SETTING K" key 242) include, for example, page collection, sort, selection of paper discharge tray, saddle stitch, watermark printing and book binding.

Again referring to FIG. 2, regular UI 200 further includes a "SWITCH" key 260 for switching the UI screen displayed on touch-panel display 122 from the regular UI to the simplified UI.

Figure 4:
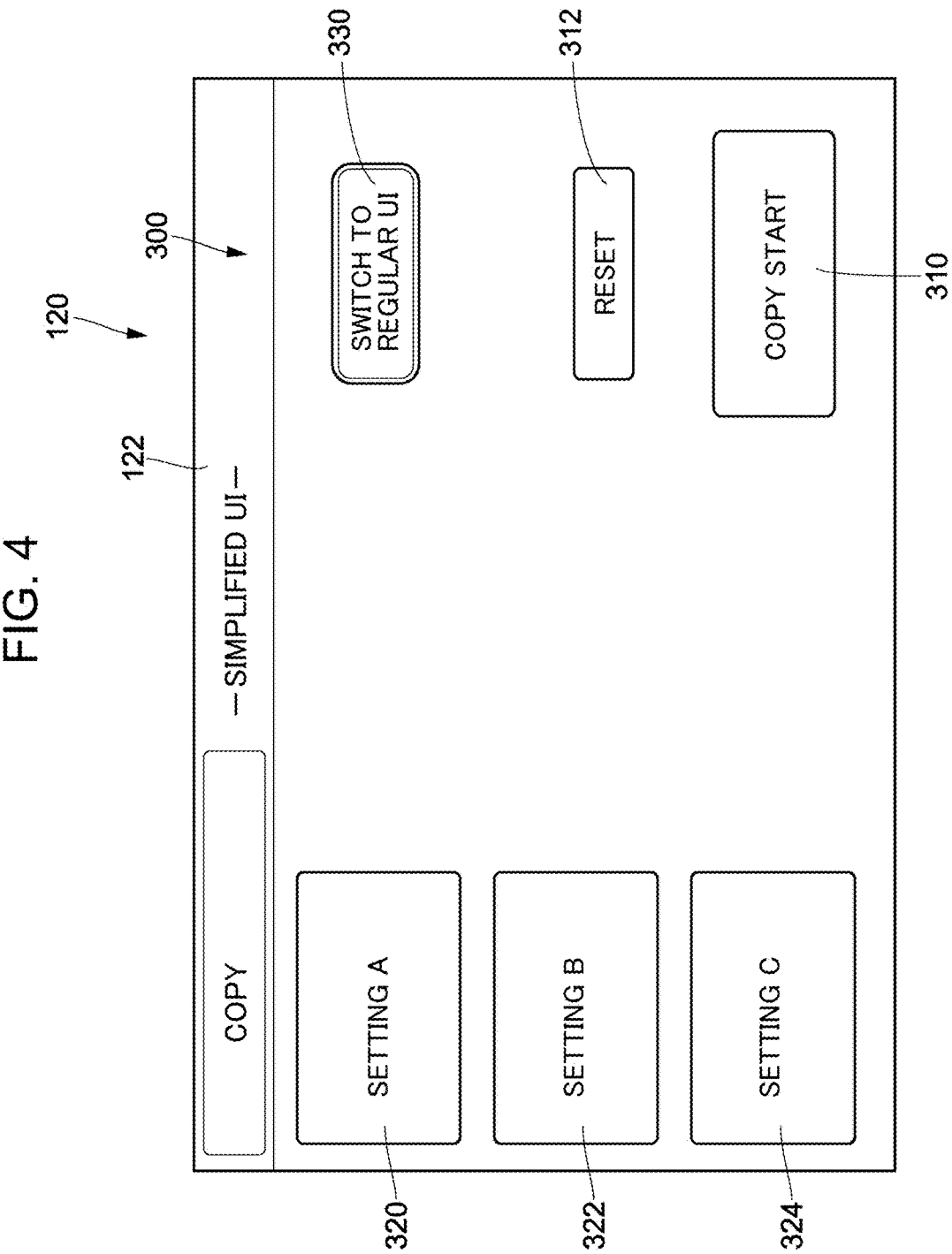
FIG. 4 shows an example of a UI screen (simplified UI) displayed on the operation unit of the image forming apparatus shown in FIG. 1.

Referring to FIG. 4, the simplified UI 300 is an easily viewable UI screen having basic functions collected in a simple manner. Simplified UI 300 includes a "COPY START" key 310 for starting copy printing, and a "RESET" key 312 for cancelling settings. Simplified UI 300 further includes software keys (setting keys) for setting some (for example, basic functions) of the functions available in the copy mode. When these setting keys are operated, functions corresponding to the operated setting keys are set. In FIG. 4, these setting keys are simply shown as "SETTING A" key 320, "SETTING B" key 322 and "SETTING C" key 324. "SETTING A" key 320, "SETTING B" key 322 and "SETTING C" key 324 have the same functions as "SETTING A" key 220, "SETTING B" key 222 and "SETTING C" key 224 of regular UI 200, respectively. Simplified UI 300 further includes a "SWITCH" key 330 for switching the UI screen displayed on touch-panel display 122 from the simplified UI to the regular UI.

Regarding color mode setting on the regular UI 200 and simplified UI 300, "AUTO", "FULL COLOR", "MONOCHROME" or "TWO COLOR" may be set. When set to "AUTO", image forming apparatus 100 automatically determines the colors of a document and if the document is a color document, executes full color copy printing and if the document is a monochrome document, executes copy printing in black. If set to "FULL COLOR", image forming apparatus 100 executes copy printing in full color, using all four colors, that is, yellow, magenta, cyan and black. When set to "MONOCHROME", image forming apparatus 100 executes copy printing in black and white, regardless of the document color. When set to "TWO COLOR", image forming apparatus 100 executes copy printing in designated two colors. In simplified UI 300, the color mode is set to "AUTO" as a default. Therefore, when the color mode setting is not changed and the "COPY START" key 310 on simplified UI 300 is operated, color copy printing or monochrome copy printing is executed in accordance with the document color.

[Software Configuration]

Figure 5:
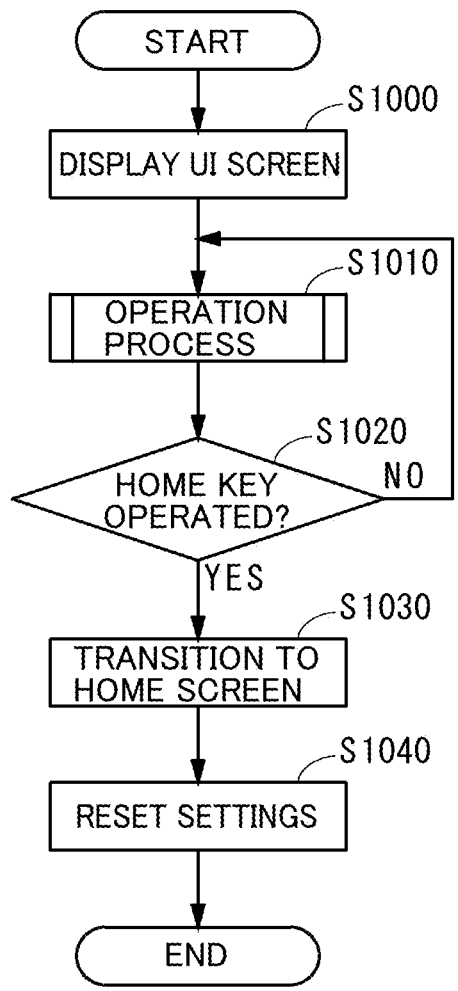
FIG. 5 is a flowchart representing a control structure of a program executed by the image forming apparatus shown in FIG. 1.

Referring to FIG. 5, a control structure of a computer program executed in image forming apparatus 100 in order to improve convenience for the user operations in the selected operational mode will be described. In the following, an example, in which the copy mode is the selected operational mode, will be described.

The program starts when one operational mode (copy mode) is selected from the plurality of operational modes by a user operation on the home screen. The program includes a step S1000 of displaying a UI screen on touch-panel display 122. In the present embodiment, it is assumed that regular UI 200 is set beforehand to be displayed on touch-panel display 122 in response to selection of the copy mode on the home screen. Therefore, at step S1000, regular UI 200 is displayed on touch-panel display 122. Simplified UI 300 may be set to be displayed, rather than regular UI 200. Alternatively, a configuration may be used in which the user can select which of the regular UI 200 and the simplified UI 300 is to be displayed.

Figure 6:
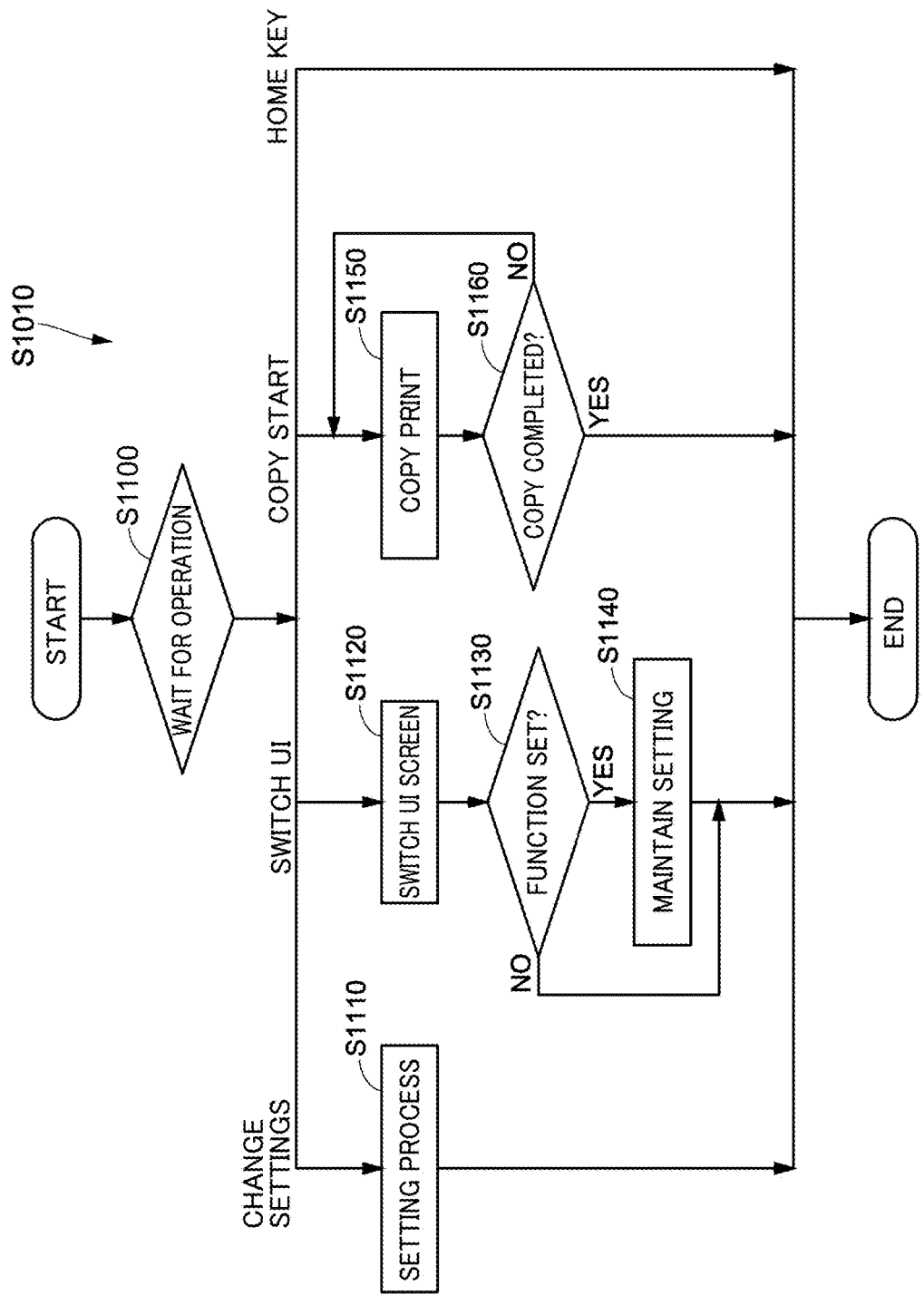
FIG. 6 is a detailed flow of the step S1010 of FIG. 5.

The program further includes a step S1010, executed after step S1000, of executing a process in accordance with a user operation on operation unit 120. FIG. 6 is a detailed flow of step S1010 shown in FIG. 5. Referring to FIG. 6, this routine includes a step S1100 of waiting for an input of an operation instruction by the user on operation unit 120, and upon receiving the input of an operation instruction, determining the type of the input operation instruction. The control structure branches in accordance with the result of determination, as shown in FIG. 6.

This routine further includes a step S1110, responsive to reception of an instruction input (change of setting) for setting a function on the displayed UI screen, of performing the process of setting the corresponding function. When the process of step S1110 ends, this routine ends.

This routine further includes a step S1120, responsive to reception of an input of instruction (UI switch) for switching the UI screen, of switching the UI screen displayed on touch-panel display 122 to the other UI screen; a step S1130, executed after step S1120, of determining whether or not any function has been set before the switching of UI screen, and branching the flow of control depending on the result of determination; and a step 1140, executed if it is determined at step S1130 that a function has been set, of maintaining the setting of the function and ending the routine. If it is determined at step S1130 that no function has been set, the routine also ends.

This routine further includes a step S1150, responsive to an input of a copy start instruction, of executing a copy printing process; and a step S1160, executed after step S1150, of determining whether the copy printing is completed, and waiting until the copy printing ends. If it is determined at step S1160 that the copy printing is completed, the routine ends. This routine also ends if it is determined at step S1100 that the input of the operation instruction by the user is an input instructing transition to the home screen (operation of home key).

Again referring to FIG. 5, the program further includes a step S1020, executed after step S1010, of determining whether or not an input instructing transition to the home screen (operation of the home key) is received, and branching the flow of control depending on the result of determination. If it is determined at step S1020 that an input instructing transition to the home screen is not received, the control returns to step S1010, and waits for a next input of operation instruction by the user.

The program further includes: a step S1030, executed if it is determined at step S1020 that an input instructing transition to the home screen is received, of causing a transition of the displayed screen on touch-panel display 122 to the home screen; and a step S1040, executed after step S1030, of returning function settings to default settings (resetting settings). When the process of step S1040 ends, the program ends.

[Operation]

Image forming apparatus 100 in accordance with the present embodiment operates in the following manner. In the following description, of the operations of image forming apparatus 100, only those related to the present invention will be described. Other operations are the same as those in the conventional image forming apparatuses.

Assume that by the operation of a user on the home screen, the copy mode is selected from the plurality of operational modes. Image forming apparatus 100 displays regular UI 200 (see FIG. 2) on touch-panel display 122, as the UI screen for the copy mode (step S1000).

When "SWITCH" key 260 of regular UI 200 is operated by the user, image forming apparatus 100 switches the UI screen displayed on touch-panel display 122 from regular UI 200 to simplified UI 300 (see FIG. 4) (step S1120). Similarly, when "SWITCH" key 330 on simplified UI 300 is operated by the user, image forming apparatus 100 switches the UI screen displayed on touch-panel display 122 from simplified UI 300 to regular UI 200 (step S1120).

Figure 7:
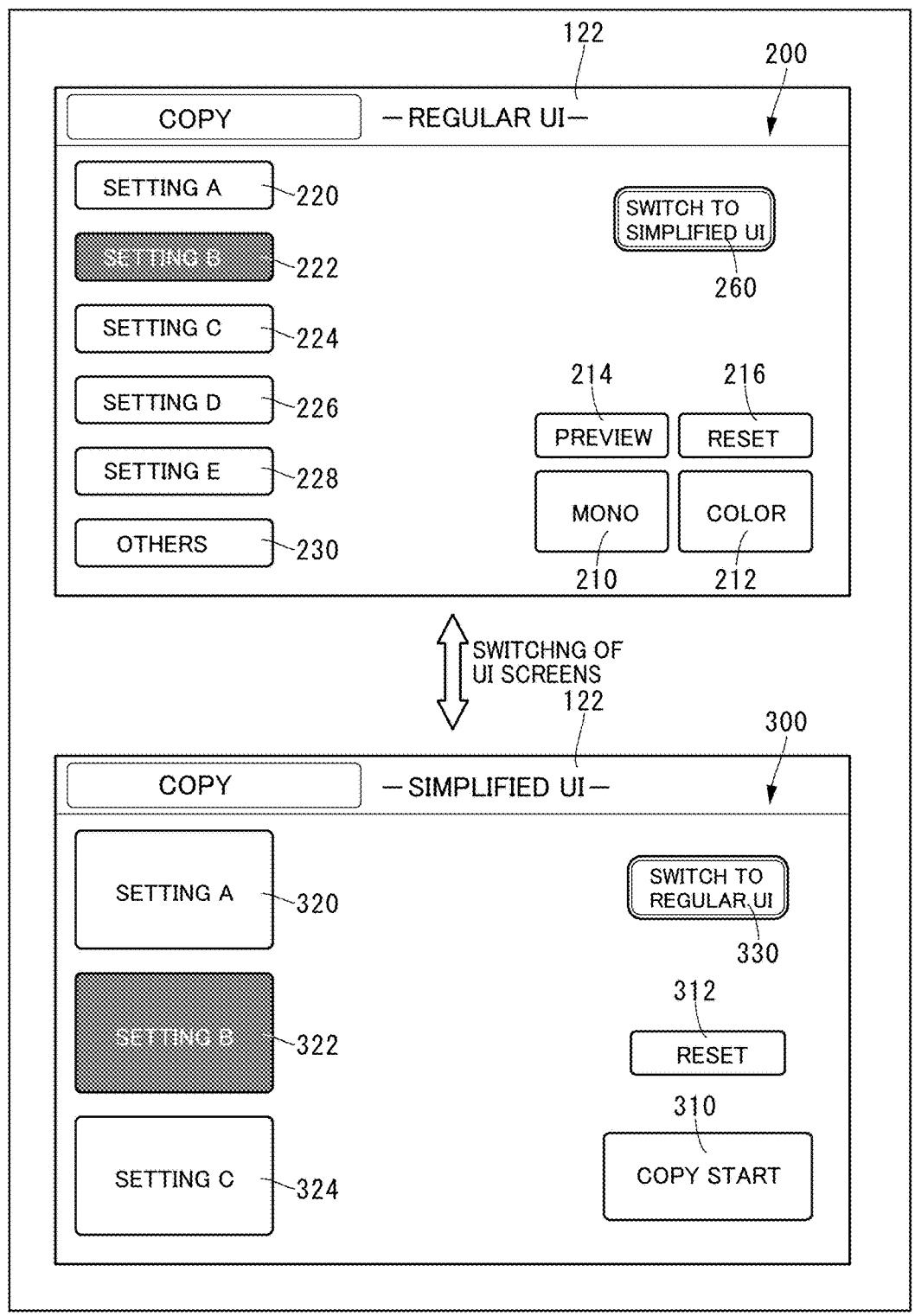
FIG. 7 is an illustration of the operation for switching the UI screen displayed on the operation unit.

Referring to FIG. 7, assume, for example, that on regular UI 200, "SETTING B" key 222 is operated and the function corresponding to "SETTING B" key 222 is set (step S1110). Then, if "SWITCH" key 260 of regular UI 200 is operated by the user, image forming apparatus 100 switches the UI screen displayed on touch-panel display 122 from regular UI 200 to simplified UI 300 (step S1120). Image forming apparatus 100 determines whether or not any function has been set before the switching of UI screen. Here, the function corresponding to "SETTING B" key 222 has been set. Therefore, image forming apparatus 100 determines that a function has been set before the switching of UI screen (YES at step S1130). If it is determined that any function has been set before the switching of UI screen, image forming apparatus maintains the setting of the function (step S1140). Specifically, when "SWITCH" key 260 is operated after the function corresponding to "SETTING B" key 222 is set, image forming apparatus 100 switches the UI screen from regular UI 200 to simplified UI 300 while maintaining the setting. Similarly, if "SWITCH" key 330 is operated after any function is set on simplified UI 300, image forming apparatus 100 switches the UI screen from simplified UI to regular UI 200 while maintaining the setting. In FIG. 7, that the function is set is indicated by the highlighted setting key.

On regular UI 200, a larger number of functions can be set than on simplified UI 300. Therefore, it is possible that a function (for example, a function corresponding to "SETTING D" key 226) that cannot be set on simplified UI 300 is set on regular UI 200 and thereafter, the UI screen is switched to simplified UI 300. In such a situation, according to the present embodiment, the UI screen can be switched to the simplified UI 300 while the setting done on the regular UI 200 is maintained. Specifically, the settings omitted on simplified UI 300 are set to default values, and if any such function is set on regular UI 200, the default setting is changed when the UI screen is switched to simplified UI 300.

Receiving an instruction to start copying, image forming apparatus 100 starts copy printing (step S1150). When a desired function is set by an operation of a setting key, image forming apparatus 100 executes the copy printing in accordance with the setting. By way of example, if two-sided copy is set, image forming apparatus 100 executes two-sided coy printing. When the copy printing ends (YES at step S1160), the state before the start of copying is resumed. When the home key is operated by the user (YES at step S1020), the display screen on touch-panel display 122 makes a transition to the home screen (step S1030). When transition to the home screen takes place, the function or functions set in the copy mode are cancelled (reset) (step S1040).

[Functions/Effects]

As is apparent from the foregoing description, use of image forming apparatus 100 in accordance with the present embodiment attains the following effects.

In image forming apparatus 100 in accordance with the present embodiment, in response to an instruction input by the user, the displayed UI screen is switched from one to the other of the regular UI 200 and simplified UI 300. When the UI screen is to be switched, it is unnecessary to go to a screen specially for the switching (for example, to the home screen) and, hence, switching is not troublesome or time consuming. Therefore, even when the user is not sure which UI screen to choose, the UI screen suitable for the user can easily be selected, since the UI screens can be switched easily.

It is sometimes necessary to switch the UI screen during settings. For example, when a necessary function is not found on simplified UI 300, switching from simplified UI 300 to regular UI 200 becomes necessary, or when the user feels that regular UI 200 has too many functions and it is difficult to determine which function is necessary, switching from regular UI 200 to simplified UI 300 becomes necessary. In the image forming apparatus 100 in accordance with the present embodiment, whether any function has been set before the switching of UI screen is determined. If any function has been set, the setting is not cleared (cancelled) but maintained even on the switched-in UI screen. In this manner, image forming apparatus 100 allows switching of the UI screen without necessitating any troublesome or time-consuming operation. In addition, it is unnecessary to re-do the settings. Thus, convenience for the user can be improved.

Second Embodiment

The image forming apparatus in accordance with the present embodiment differs from image forming apparatus 100 in accordance with the first embodiment in that when a function not settable on the simplified UI has been set, the set function can be confirmed on the simplified UI. Except for this point, the image forming apparatuses have the same configurations.

In the image forming apparatus in accordance with the present embodiment, at the time of switching from the regular UI to the simplified UI, whether or not a function not settable by the simplified UI has been set is determined. If it is determined that such a function has been set, in the image forming apparatus, an icon indicating the fact is displayed on the simplified UI.

Figure 8:
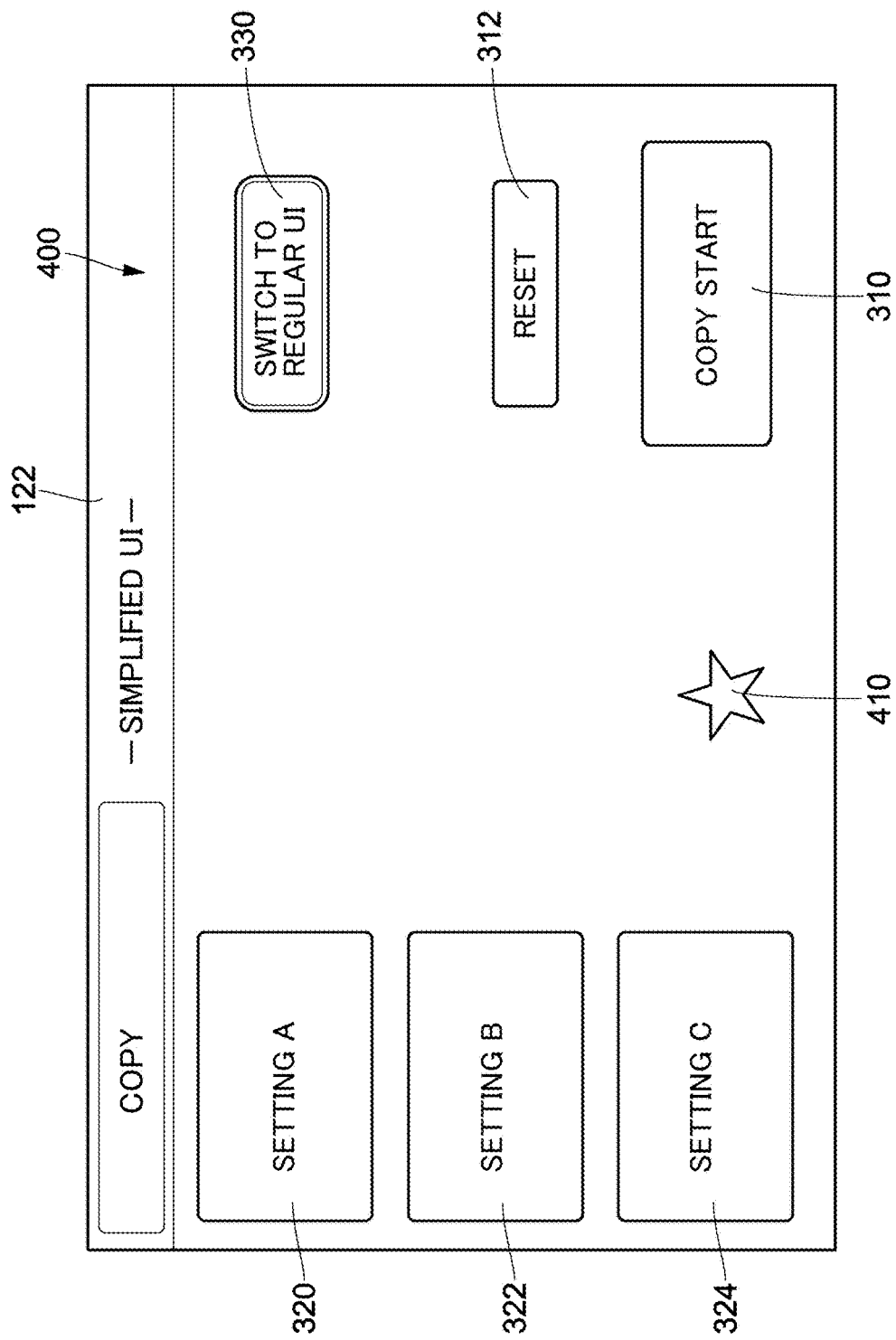
FIG. 8 shows an example of a UI screen (simplified UI) displayed on the operation unit of the image forming apparatus in accordance with a second embodiment of the present invention.
Figure 9:
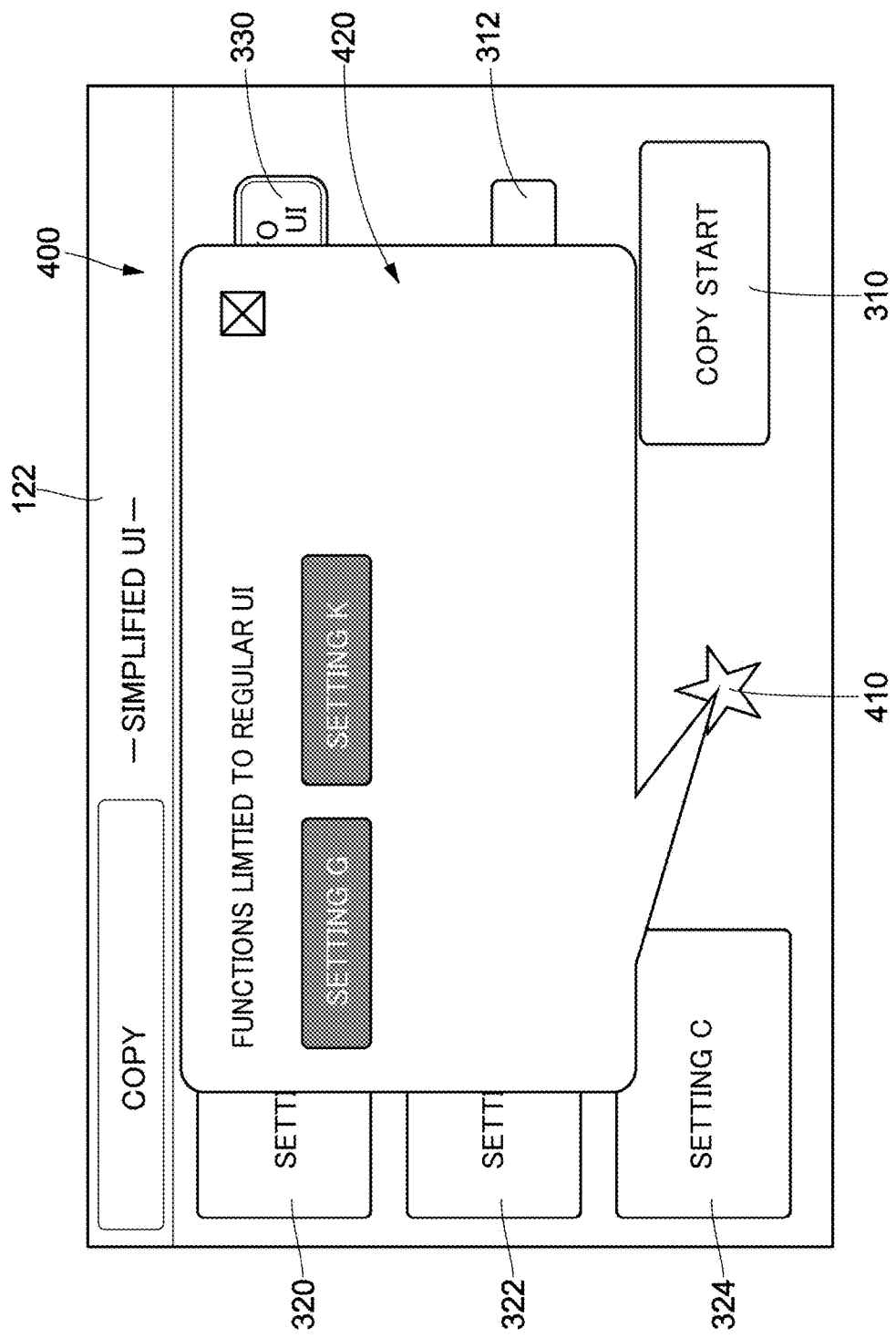
FIG. 9 shows another example of the screen image on the UI screen of FIG. 8.

Referring to FIG. 8, in the present embodiment, in place of simplified UI 300 (see FIG. 4), a simplified UI 400 is displayed. Simplified UI 400 has substantially the same configuration as simplified UI 300. It is noted, however, that if a function not settable by simplified UI 400 has been set using regular UI 200, an icon 410 appears on simplified UI 400 when switching to simplified UI 400 takes place. Referring to FIG. 9, when this icon 410 is operated by the user, a pop-up screen 420 appears, and in the pop-up screen 420, the function that has been set on regular UI 200 and not settable by simplified UI 400 is displayed. FIG. 9 shows an example in which a function corresponding to "SETTING G" key 234 and a function corresponding to "SETTING K" key 242 on regular UI 200 (see FIG. 3) are set.

Figure 10:
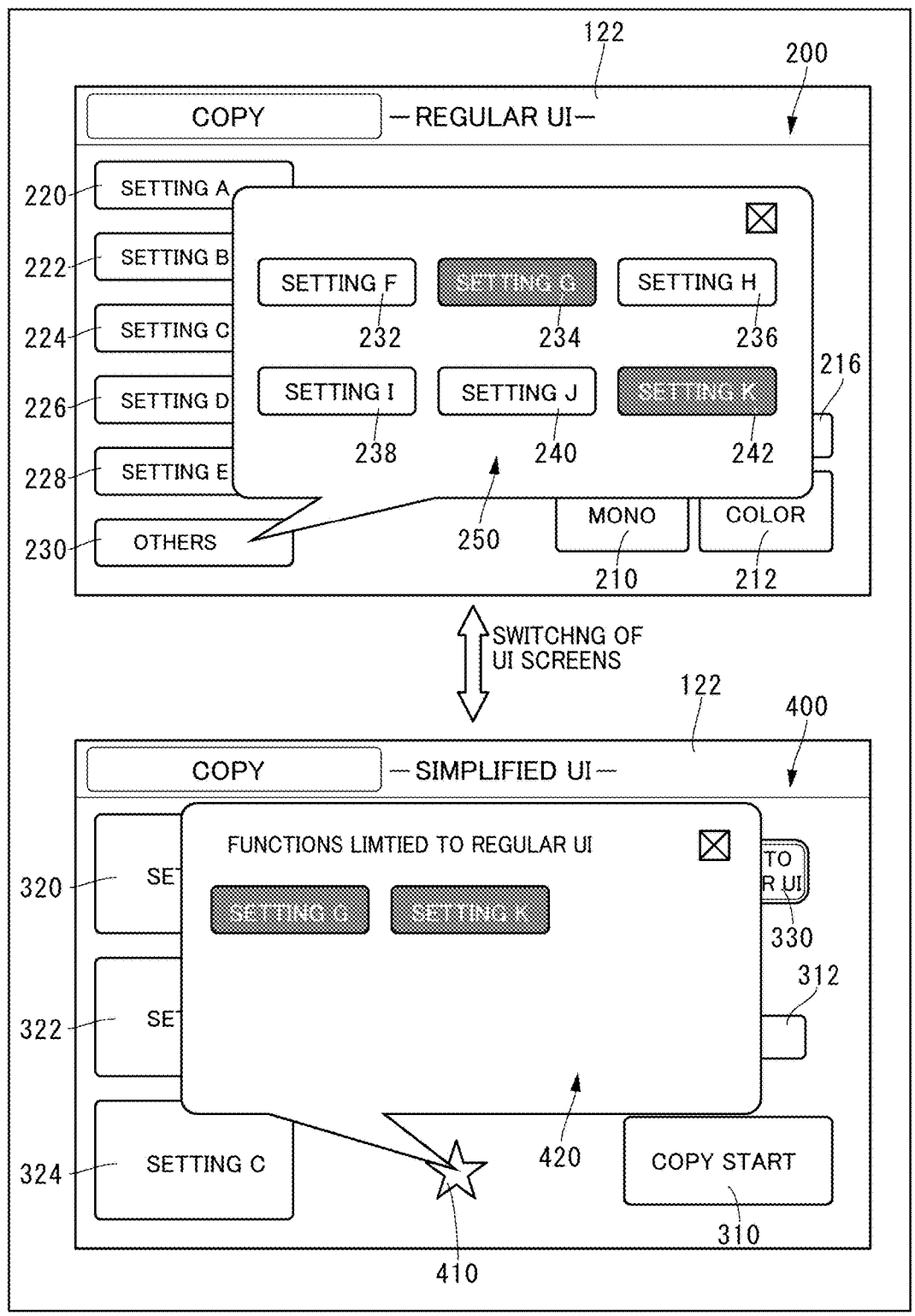
FIG. 10 is an illustration of the operation for switching the UI screen displayed on the operation unit.

Referring to FIG. 10, description will be given in greater detail. Assume that "SETTING G" key 234 and "SETTING K" key 242 are operated on regular UI 200 and thereafter, the UI screen is switched to simplified UI 400. Simplified UI 400 does not include functions corresponding to "SETTING G" key 234 and "SETTING K" key 242. If it is determined that functions not settable by simplified UI 400 have been set, image forming apparatus 100 displays an icon 410 on a prescribed area of simplified UI 400. By operating this icon 410, it is possible for the user to confirm details of the set functions.

As described above, even when the function or functions set on regular UI 200 are not included in simplified UI 400, the set contents (changed contents) are displayed on simplified UI 400 when switching from regular UI 200 to simplified UI 400 takes place. Thus, it is possible to avoid application of settings not intended by the user. In addition, it is unnecessary to switch the UI screen to the regular UI 200 to confirm the settings. Thus, convenience for the user can further be improved.

Third Embodiment

The image forming apparatus in accordance with the present embodiment differs from image forming apparatus in accordance with the second embodiment in that when a function not settable on the simplified UI has been set, the set function can be cancelled on the simplified UI. Except for this point, the image forming apparatuses have the same configurations.

Figure 11:
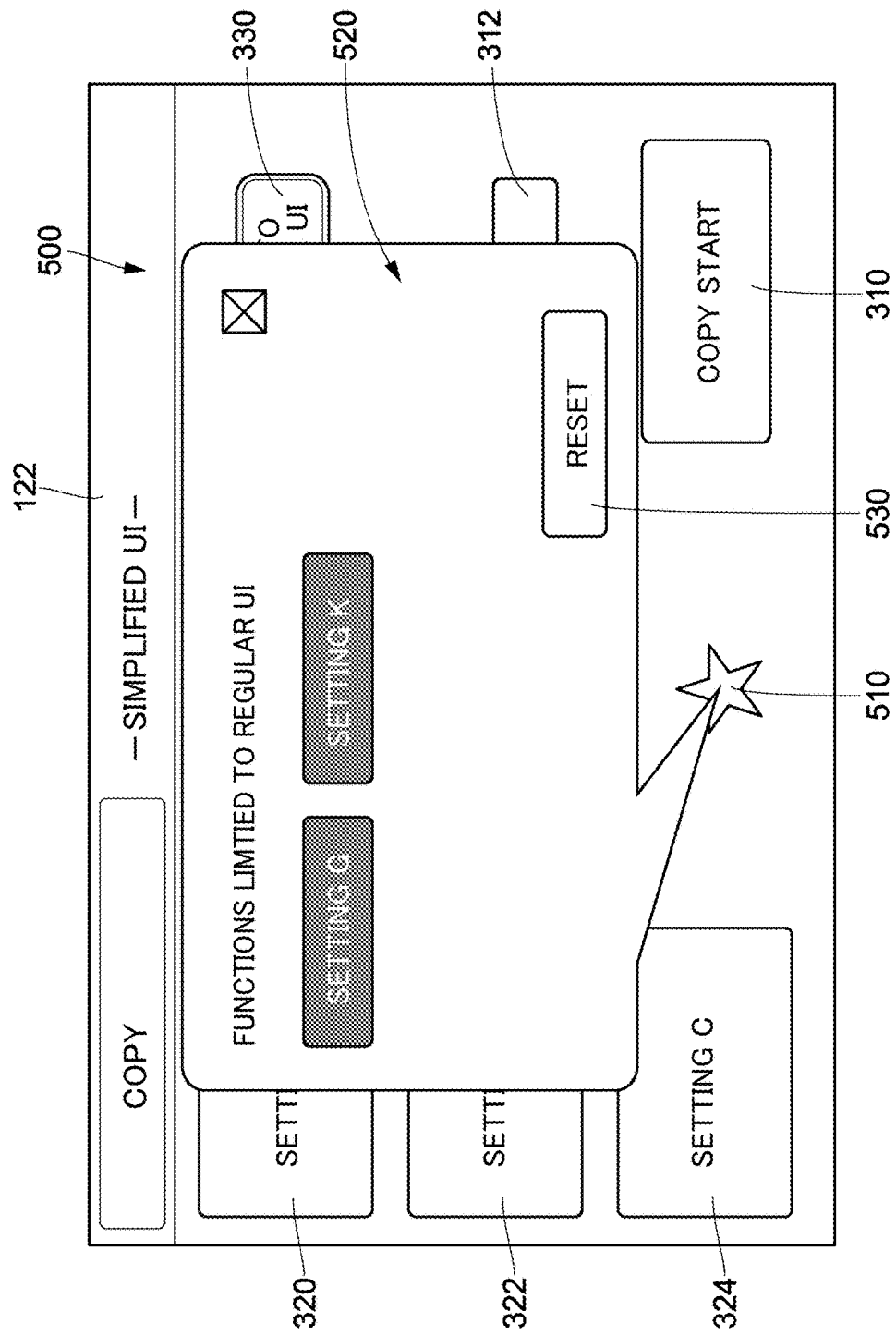
FIG. 11 shows an example of a UI screen (simplified UI) displayed on the operation unit of the image forming apparatus in accordance with a third embodiment of the present invention.

As in the second embodiment, in the image forming apparatus in accordance with the present embodiment, at the time of switching from the regular UI to the simplified UI, whether or not a function not settable by the simplified UI has been set is determined. Referring to FIG. 11, if it is determined that such a function has been set, an icon 510 indicating the fact is displayed on a simplified UI 500. When this icon 510 is operated by the user, a pop-up screen 520 appears, and in the pop-up screen 520, the function set on regular UI 200 and not settable by simplified UI 500 is displayed. In the present embodiment, in pop-up screen 520, a "RESET" key 530 for cancelling the setting of the function not settable by simplified UI 500 is displayed. When the "RESET" key 530 is operated, the setting or settings of functions set on regular UI 200 and not settable by simplified UI 500 are collectively cancelled (reset).

FIG. 11 shows an example in which a function corresponding to "SETTING G" key 234 and a function corresponding to "SETTING K" key 242 on regular UI 200 (see FIG. 3) are set. When "RESET" key 530 is operated, settings of the functions corresponding to "SETTING G" key 234 and "SETTING K" key 242 are cancelled. Function or functions other than those displayed on pop-up screen are not cancelled by the operation of "RESET" key 530. Other configurations of simplified UI 500 are the same as those of simplified UI 400 shown in FIG. 8.

In this manner, by providing a "RESET" key 530 on simplified UI 500, it becomes unnecessary to switch the UI screen to cancel the settings. Thus, convenience for the user can further be improved.

Fourth Embodiment

The image forming apparatus in accordance with the present embodiment differs from image forming apparatus in accordance with the second embodiment in that when a function not settable on the simplified UI has been set, the set function can be cancelled on the simplified UI. Except for this point, the image forming apparatuses have the same configurations.

Figure 12:
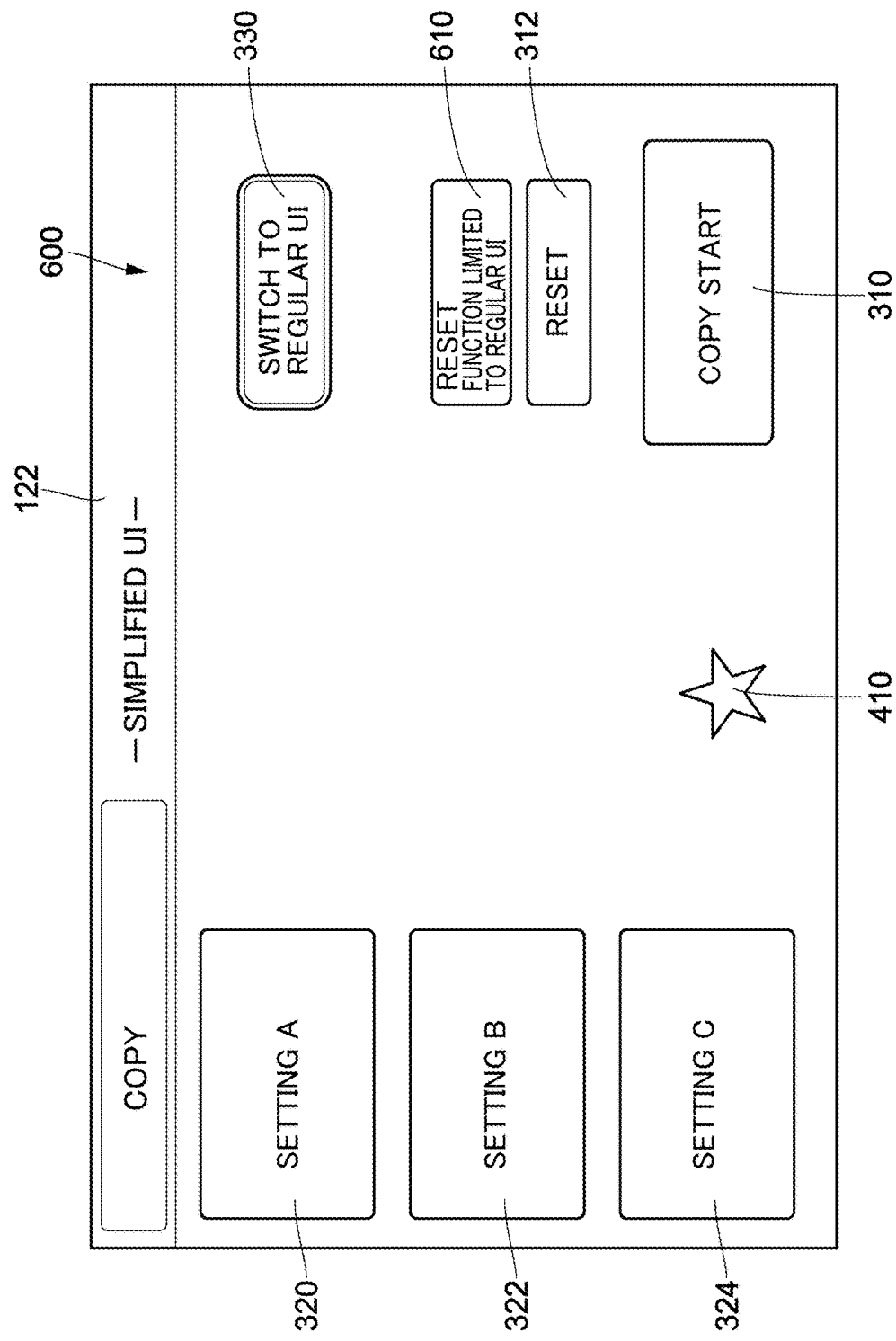
FIG. 12 shows an example of a UI screen (simplified UI) displayed on the operation unit of the image forming apparatus in accordance with a fourth embodiment of the present invention.

As in the second embodiment, in the image forming apparatus in accordance with the present embodiment, at the time of switching from the regular UI to the simplified UI, whether or not a function not settable by the simplified UI has been set is determined. Referring to FIG. 12, if it is determined that such a function has been set, an icon 410 indicating the fact is displayed on a simplified UI 600.

Simplified UI 600 includes a "RESET" key 610 for cancelling the setting of a function set on regular UI 200 and not settable on simplified UI 600. The "RESET" key 610 is displayed on a prescribed area of the display screen of simplified UI 600. In this point, the image forming apparatus in accordance with the present embodiment is different from the third embodiment in which the "RESET" key 530 having the same function as "RESET" key 610 is displayed on the pop-up screen 520. Except for this point, the configuration of simplified UI 600 is the same as that of simplified UI 400.

"RESET" key 610 may be constantly displayed on the display screen of simplified UI 600 or it may be displayed when icon 410 is displayed.

Fifth Embodiment

The image forming apparatus in accordance with the present embodiment differs from image forming apparatus 100 in accordance with the first embodiment in that only when a function settable both by the regular UI and the simplified UI is set, the setting of the function is maintained when the UI screen is switched. Except for this point, the image forming apparatuses have the same configurations.

At the time of switching of UI screen, the image forming apparatus in accordance with the present embodiment determines whether or not a function settable both by the regular UI and the simplified UI (common function) has been set. If it is determined that a common function is set, the image forming apparatus maintains the set condition of the set common function.

[Software Configuration]

Figure 13:
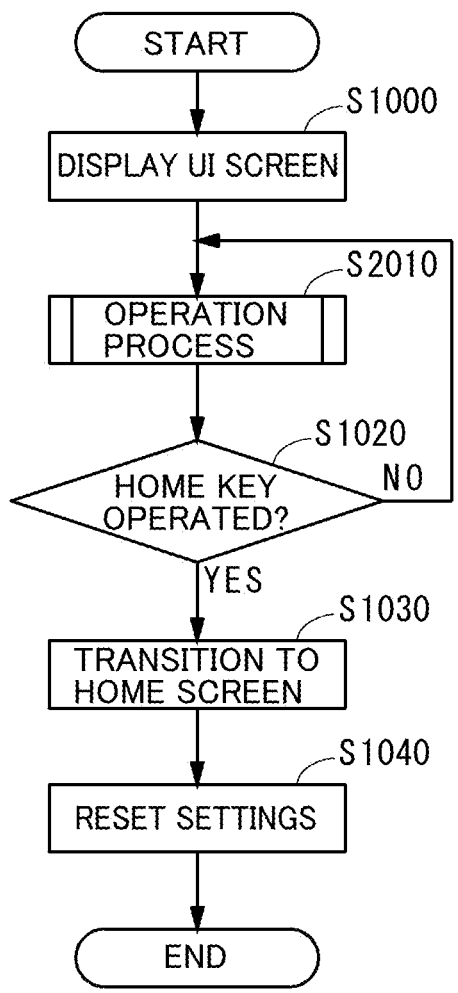
FIG. 13 is a flowchart representing a control structure of a program executed by the image forming apparatus in accordance with a fifth embodiment of the present invention.

In the image forming apparatus in accordance with the present embodiment, in place of the program shown in FIG. 5, the program shown in FIG. 13 is executed. The program of FIG. 13 includes, in place of step S1010 of FIG. 5, a step S2010. Processes at step S1000 and steps S1020 to S1040 are the same as those of FIG. 5.

Figure 14:
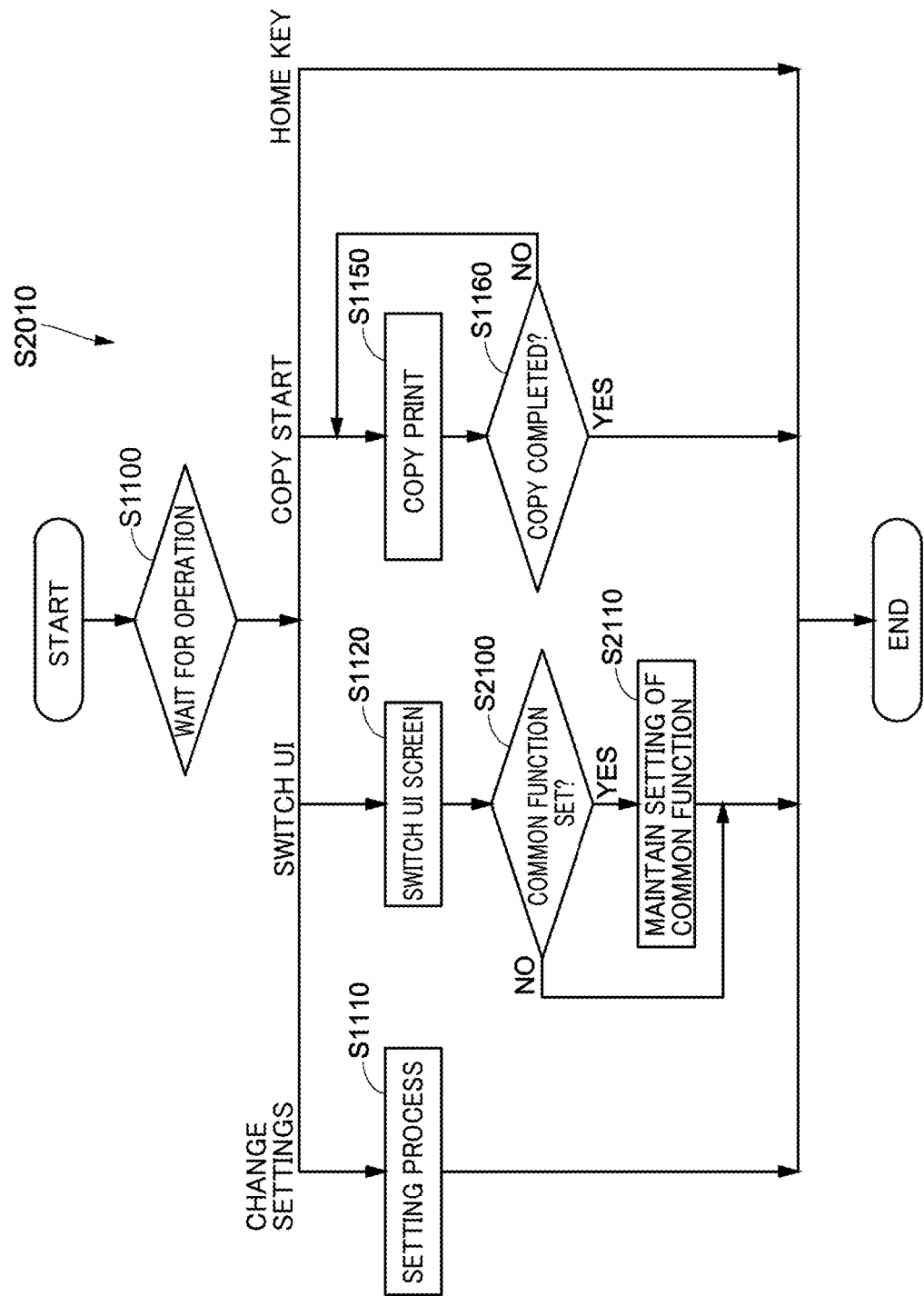
FIG. 14 is a detailed flow of the step S2010 of FIG. 13.

FIG. 14 is a detailed flow of step S2010 shown in FIG. 13. Referring to FIG. 14, this routine includes, in place of steps S1130 and S1140 of FIG. 6, steps S2100 and S2110, respectively. Processes at steps S1100 to S1120, S1150 and S1160 are the same as those of FIG. 5. In the following, differences will be described.

Referring to FIG. 14, this routine includes: a step S2100, executed after step S1120, of determining whether or not any common function has been set before the switching of UI screen, and branching the flow of control depending on the result of determination; and a step S2110, executed if it is determined at step S2100 that a common function has been set, of maintaining the setting of the common function and ending the routine. The routine also ends if it is determined at step S2100 that no common function has been set.

[Functions/Effects]

When the UI screen is switched, only when a function settable both by the regular UI and the simplified UI has been set, the image forming apparatus maintains the setting of the function. If a function settable only by one of the UI screen (for example, regular UI) has been set, the setting of the function is cancelled when the UI screen is switched. Since only the setting of a function that can be confirmed both by the regular UI and the simplified UI is maintained, it is possible to prevent application of a setting not intended by the user.

(Modifications)

In the embodiments above, examples in which the present invention is applied to an MFP as an example of image forming apparatus have been described. The present invention, however, is not limited to such embodiments. The image forming apparatus may be any apparatus other than the MFP. By way of example, the image forming apparatus may be a copy machine or a printer. Though the operation unit is provided on the image forming apparatus in the embodiments above, the present invention is not limited to such embodiments. The operation unit may be provided on a different electronic device. A scanner device is an example of such an electronic device.

Though an example in which two UI screens of regular UI and simplified UI are switched alternately has been described in the embodiments above, the present invention is not limited to such embodiments. By way of example, three or more UI screens may be switched one another.

Though an example in which the UI screens are switched when the selected operational mode is the copy mode has been described in the embodiments above, the UI screens can be switched in every operational mode. It is also possible that switching of UI screen is not allowed in one or more operational modes.

Though the "SWITCH" key for switching the UI screen is displayed as a software key on each UI screen in the embodiments above, the "SWITCH" key may be a hardware key. A configuration in which the UI screen is switched by a gesture operation (for example, a flick operation) on the touch-panel display, or a configuration in which the UI screen is switched by a voice input may be possible. When "SWITCH" is a software key, the "SWITCH" key on each UI screen may be displayed or made valid when a function is set.

Though an example in which the setting or settings of functions set on the regular UI and not settable by the simplified UI are collectively cancelled by an operation of "RESET" key 530 or 610 has been described in the embodiments above, the present invention is not limited to such embodiments. By way of example, the function or functions set on the regular UI and not settable by the simplified UI may be displayed as operable software keys, and by operating the software keys of respective functions, the functions displayed on the pop-up screen may be cancelled one by one.

Though an operation unit including a touch-panel display has been described in the embodiments above, the present invention is not limited to such embodiments. The operation unit may include a display (display panel) other than the touch-panel display. For example, an instruction related to the information to be displayed on the display may be input through hardware.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An operation console provided on an apparatus as an object of control, comprising:
    a display that displays information related to a process executed by the apparatus as the object of control;
    an input receiver that receives an input of an operation instruction related to information to be displayed on the display; and
    a controller; wherein
    the controller is programmed to control the display to display a first operation screen which includes a plurality of items settable by an input of an operation instruction received by the input receiver or a second operation screen which includes a portion of the plurality of items including a common item that is common to the first operation screen and the second operation screen;
    the controller is programmed to, responsive to reception of an instruction input by a user, switch the operation screen displayed on the display from one to the other of the first operation screen and the second operation screen;
    the controller is programmed to determine whether or not any item has been set before the switching of the operation screen;
    the controller is programmed to determine whether the common item has been set before the switching of the operation screen, and maintain setting of the set common item on the switched-in operation screen after the switching of the operation screen;
    the controller is programmed to determine whether any not-common item that is not common to the first operation screen and the second operation screen has been set responsive to the reception of the instruction input by the user instructing the switching of the operation screen, and, responsive to a positive determination that the not-common item has been set, automatically cancel setting of the not-common item by canceling a setting of a function of the not-common item.

2. The operation console according to claim 1, wherein
    the first operation screen and the second operation screen each include an operation item operated by the user when display of the operation screen is to be switched; and
    the controller is programmed to switch the operation screen on the display from one to the other of the first operation screen and the second operation screen, in response to an operation of the operation item by the user.

3. An electronic device comprising:
    the operation console according to claim 1; and
    a processor that executes, in response to an instruction from the operation console, a process designated by the instruction.

4. An image forming apparatus, comprising:
    the operation console according to claim 1; and
    an image forming unit that forms an image on a recording medium, in response to an instruction from the operation console.

* * * * *